(12) United States Patent
Chang et al.

(10) Patent No.: US 7,680,300 B2
(45) Date of Patent: Mar. 16, 2010

(54) VISUAL OBJECT RECOGNITION AND TRACKING

(75) Inventors: Chu-Yin Chang, Plano, TX (US); James D. English, Newton, MA (US); Neil M. Tardella, West Haven, CT (US)

(73) Assignee: Energid Technologies, Cambridge, MA (US)

( * ) Notice: Subject to any disclaimer, the term of this patent is extended or adjusted under 35 U.S.C. 154(b) by 1137 days.

(21) Appl. No.: 11/141,843

(22) Filed: May 31, 2005

(65) Prior Publication Data

US 2006/0008119 A1    Jan. 12, 2006

Related U.S. Application Data

(60) Provisional application No. 60/575,189, filed on Jun. 1, 2004.

(51) Int. Cl.
*G06K 9/00* (2006.01)
*H04N 5/225* (2006.01)
*G06T 15/00* (2006.01)

(52) U.S. Cl. ............... 382/103; 382/154; 348/169; 345/419

(58) Field of Classification Search ........... 348/169, 348/170, 171, 172, 42–60; 382/103, 154, 382/285; 345/419–427; 356/12–14; 359/462–477; 352/57–65
See application file for complete search history.

(56) References Cited

U.S. PATENT DOCUMENTS

| | | | | |
|---|---|---|---|---|
| 5,745,126 A | * | 4/1998 | Jain et al. | 382/154 |
| 5,761,326 A | * | 6/1998 | Brady et al. | 382/103 |
| 5,801,970 A | * | 9/1998 | Rowland et al. | 703/6 |
| 5,828,770 A | * | 10/1998 | Leis et al. | 382/103 |
| 5,850,352 A | * | 12/1998 | Moezzi et al. | 345/419 |
| 5,859,922 A | * | 1/1999 | Hoffmann | 382/128 |
| 6,173,066 B1 | * | 1/2001 | Peurach et al. | 382/103 |
| 6,198,998 B1 | * | 3/2001 | Farmer et al. | 382/103 |
| 6,314,204 B1 | * | 11/2001 | Cham et al. | 382/228 |
| 2001/0032879 A1 | * | 10/2001 | He et al. | 235/383 |

(Continued)

FOREIGN PATENT DOCUMENTS

WO    WO-9706631 A2 *    2/1997

(Continued)

OTHER PUBLICATIONS

Zhang et al., 'Face recognition under variable lighting using harmonic image exemplars', Jun. 2003, Proceedings of the 2003 IEEE Computer Society Conference on Computer Vision and Pattern Recognition, vol. 1, pp. 19-25.*

(Continued)

*Primary Examiner*—Aaron W Carter
(74) *Attorney, Agent, or Firm*—Brian J Colandreo, Esq.; Holland & Knight LLP

(57) ABSTRACT

This invention describes a method for identifying and tracking an object from two-dimensional data pictorially representing said object by an object-tracking system through processing said two-dimensional data using at least one tracker-identifier belonging to the object-tracking system for providing an output signal containing: a) a type of the object, and/or b) a position or an orientation of the object in three-dimensions, and/or c) an articulation or a shape change of said object in said three dimensions.

30 Claims, 6 Drawing Sheets

U.S. PATENT DOCUMENTS

2004/0017929 A1*  1/2004  Bramblet et al. ............ 382/103

FOREIGN PATENT DOCUMENTS

WO        WO-9843105 A2 * 10/1998

OTHER PUBLICATIONS

Fung et al., 'Computer Vision Signal Processing on Graphics Processing Units', May 2004, Proceedings IEEE International Conference on Acoustics, Speech, and Signal Processing, vol. 5, pp. 93-96.*

Winkler et al., 'A Feature Map Approach to Pose Estimation Based on Quaternions', 1997, Proceedings of the 7th International Conference on Artificial Neural Networks, Lectures Notes In Computer Science, vol. 1327, pp. 949-954.*

Lienhart et al., 'A Detector Tree of Boosted Classifiers for Real-Time Object Detection and Tracking', Jul. 2003, Proceedings 2003 International Conference on Multimedia and Expo, IEEE, vol. 2, pp. 277-280.*

A Review on Image Segmentation Techniques, Pattern Recognition, by N. R. Pal and S.K. Pal, vol. 26, No. 9, pp. 1277-1294, 1993.

Optical Moving Target Detection With 3-D Matched Filtering, by L. Reed, R. Gagliardi and L. Stotts, IEEE Transactions on Aerospace and Electronic Systems, vol. 24, No. 4, Jul. 1988.

Use of Fourier and Karhunen-Loeve Decompostion for Fast Pattern Matching with a Large Set Of Templates by M. Uenoara and T. Kanade, IEEE Tranasactions on Pattern Analysis and Machine Intelligence, vol. 19, No. 8, Aug. 1997, pp. 891-898.

Parametric Eigenspace Representation for Visual Learning and Recognition by H. Murase and S.K. Nyar, Geometric Methods in Computer Vision II, SPIE, vol. 2031, 1993, pp. 378-391.

Real-Time 100 Object Recognition System by S.K. Nayar, S.A. Nene and H. Murase, Proceedings of the 1996 IEEE International Conference on Robotics and Automation, Minneapolis, Minnesota, Apr. 1996.

Modified Matched Filter for Cloud Clutter Suppression, by W. A. Schmidt, IEEE Transactions on Pattern Analysis and Machine Intelligence, vol. 12, No. 6, Jun. 1990.

Detection of 3D Objects in Cluttered Scenes Using Hierarchical Eigenspace by M. Hiroshi and S.K. Nayar, Pattern Recognition Letters, vol. 18, 1997, pp. 375-384.

Some Properties of Hyperspherical Harmonics, by Z.Y. Wen and J. Avery, The Journal of Mathematical Physics, vol. 26, No. 3, Mar. 1985, pp. 396-403.

Fast Eigenspace Decomposition of Correlated Images, by C.Y. Chang, A. A. Maciejewski and V. Balakrishnan, IEEE Transactions on Image Processing, Nov. 2000.

A Simplex Method for Function Minimization by J. A. Nelder and R. Mead, Computer Journal, vol. 7, pp. 308-313, 1965.

An Algorithm for Tracking Multiple Targets, Donald B. Reid, IEEE Transactions on Automatic Control, AC-24(6), pp. 843-854, Dec. 1979.

Issues in the Design of Practical Multitarget Tracking Algorithms, T. Kurien, Multitarget-Multisensor Tracking: Advanced Applications, Y. Bar-Shalom Editor, Artech House, 1990.

Simulation and Virtual Reality in Surgical Education, Paul J. Gorman, M.D., Andreas H. Meier, M.D. And Thomas M. Krummel, M.D. Arch Surg. vol. 134, Nov. 1999, pp. 1203-1208.

A Survey of Surgical Simulation: Applications, Technology, and Education, Alan Liu, Frank Tendick, Kevin Cleary and Christoph Kaufmann, Presence, vol. 12, Issue 6 (Dec. 2003).

Hyperspherical Harmonics and Generalized Sturmians, by John Avery, Progress in Theoretical Chemistry and Physics, Kluwer Academic Publishers, 2000, vol. 4, pp. 33-57.

Eigenspace Methods for Correlated Images, A Thesis Submitted to the Faculty of Purdue University By Chu-Yin Chang, Dec. 1999, pp. 18-86.

Basri, Ronen and Jacobs, David W., Lambertian Reflectance and Linear Subspaces, IEEE Transactions on Pattern Analysis and Machine Intelligence, Feb. 2003, pp. 218-233, vol. 25, No. 2, IEEE Computer Society.

* cited by examiner

VISUAL OBJECT RECOGNITION AND TRACKING

CROSS-REFERENCE TO RELATED APPLICATION AND SUPPORT DISCLOSURE

This application claims priority from U.S. Provisional Patent Application Ser. No. 60/575,189, filed Jun. 1, 2004.

STATEMENT REGARDING FEDERALLY SPONSORED RESEARCH AND DEVELOPMENT

The invention was supported by the Air Force Office of Scientific Research under contract F33615-02-M-1209, by NASA under contract NAS-9-02091 and by the Department of the Army under contract W81XWH-04-C-0048. The U.S. Government has certain rights in the invention.

BACKGROUND OF THE INVENTION

1. Technical Field

This invention generally relates to image recognition and more specifically to identifying and tracking an object from two-dimensional data pictorially representing said object.

2. Background Art

Three-dimensional objects need to be recognized and tracked for a variety of reasons, including, for example, target tracking for weapon systems, vehicle tracking for security, and hand-held object tracking for interfacing to a computer. Interfacing to a computer could be applied, for example, to game playing, tele-operation of a robotic device, or surgical tool tracking for interacting with a virtual reality simulation, etc.

Position and orientation of three-dimensional objects can be identified through several techniques, including magnetic tracking sensors, active radio frequency (RF) sensors, and vision sensors.

Vision sensors have the benefit of being passive, with no electromagnetic emission. Northern Digital Inc. provides an optical tracking system, called Optotrak. This system requires IREDs (infra-red emitting diodes) to be attached to the object that is tracked and strobed (turned off and on in a precisely controlled manner). It further requires the use of multiple sensors for triangulation. Advanced Realtime Tracking GmbH provides the ARTtrack2 system, which tracks rigidly connected markers. It does not identify or track unmodified objects. Optotrack and ARTtrack2 do not support identification and tracking of multiple objects using regular cameras through algorithms that can be automatically generated and parameterized using CAD model-objects. Optotrak and ARTtrack2 require the component being tracked to be specifically designed for that purpose. For example, Optotrack requires the object being tracked to actively emit signals.

DISCLOSURE OF THE INVENTION

The object of the present invention is to provide a method for identifying and tracking an object from two-dimensional data pictorially representing the object by processing said two-dimensional data using at least one tracker-identifier for providing an output signal containing: a) a type of the object, and/or b) a position or an orientation of the object in three-dimensions and/or c) an articulation or a shape change of said object in said three dimensions.

According to a first aspect of the invention, a method for identifying and tracking an object from two-dimensional data pictorially representing the object, comprises the steps of: receiving at least one set of the two-dimensional data pictorially representing the object, wherein the at least one set corresponds to one temporal instance and the two-dimensional data is generated by a sensor; and processing the at least one set of the two-dimensional data using at least one tracker-identifier for providing an output signal containing a) a type of the object, b) a position or an orientation of the object in three-dimensions and c) an articulation or a shape change of the object in the three dimensions, wherein the type of the object is determined using a spatial model description of the object.

According further to the first aspect of the invention, the processing may contain spatial processing of an input signal indicative of the at least one set of the two-dimensional data performed by a spatial processing block and temporal processing performed by a temporal processing block, wherein the spatial processing provides a further input signal to the temporal processing block. Further, the temporal processing block may provide an additional input signal to the spatial processing block.

Further according to the first aspect of the invention, the spatial processing may comprise the step of: generating harmonic images out of synthetic object images, wherein at least one of the synthetic object images contains the object, by further processing using a predetermined algorithm the synthetic object images using k-dimensional hyperspherical harmonic weights, wherein k is an integer of at least a value of four. Further, the further processing may be summing, averaging, selective removal, or principal component analysis. Still further, the synthetic object images may be created by selecting corresponding points on a quaternion hyperhemisphere using a predetermined method.

Still further according to the first aspect of the invention, the temporal processing may be performed for providing simultaneously the position and the orientation of the object in the three-dimensions and the articulation, all contained in the output signal. Further, the spatial processing may comprise the step of: providing synthetic object data using a graphical processing unit (GPU) or a PC graphics card, the synthetic object data is generated for matching using a predetermined criterion with at least one set of the two-dimensional data pictorially representing the object and generated by the sensor for implementing the identification and tracking, wherein the synthetic object data is generated using the articulation and the shape change of the object in the three dimensions.

According yet further to the first aspect of the invention, a four-dimensional 600-cell polytope may be used to sample the orientation of the object in the three dimensions.

According still further to the first aspect of the invention, before the step of the processing the at least one set of the two-dimensional data may be pre-processed to remove a contribution that provides no information about the object.

According further still to the first aspect of the invention, in addition to the at least one tracker-identifier, the object-tracking system may have multiple tracker-identifiers capable of generating the output signal.

According yet further still to the first aspect of the invention, the object may be a surgical instrument, a mechanical tool, an input device, a human hand, a die, a coin, an agricultural product, a flying object, a ground vehicle, a sea vehicle, a manufactured part, a human face, or a human body.

Yet still further according to the first aspect of the invention, multiple sets of the two-dimensional data at different temporal instances may be used for providing the output signal, wherein each of the multiple sets corresponds to one unique temporal instance out of the different temporal instances.

Still yet further according to the first aspect of the invention, the sensor may be an intensity sensor, a gray-level camera, a color camera, an infrared camera, and x-ray imager, imaging radar, a hyperspectral optical sensor, a stereoscopic sensor, imaging sonar, a magnetic resonance imaging sensor, a distance sensitive sensor or a ladar sensor.

Still further yet according to the first aspect of the invention, multiple objects may be identified simultaneously in the at least one set of the two-dimensional data.

According to a second aspect of the invention, an object-tracking system for identifying and tracking an object from two-dimensional data pictorially representing the object, comprises: a sensor, for receiving at least one set of the two-dimensional data pictorially representing the object, wherein the at least one set corresponds to one temporal instance; and at least one tracker-identifier, for processing the at least one set of the two-dimensional data, for providing an output signal containing a) a type of the object, b) a position or an orientation of the object in three-dimensions and c) an articulation or a shape change of the object in the three dimensions, wherein the type of the object is determined using only a spatial model description of the object available to the object-tracking system.

According further to the second aspect of the invention, the at least one tracker-identifier may comprise a spatial processing block for performing spatial processing of an input signal indicative of the at least one set of the two-dimensional data and a temporal processing block for performing temporal processing, wherein the spatial processing block provides a further input signal to the temporal processing block. Further, the temporal processing block may provide an additional input signal to the spatial processing block.

Further according to the second aspect of the invention, the spatial processing block may comprise: means for generating harmonic images out of synthetic object images, wherein at least one of the synthetic object images contains the object, by further processing using a predetermined algorithm the synthetic object images using k-dimensional hyperspherical harmonic weights, wherein k is an integer of at least a value of four. Further, the further processing may be summing, averaging, selective removal, or principal component analysis. Still further, the object-tracking system may further comprise: an object-model database, for providing corresponding points on a quaternion hyperhemisphere for creating the synthetic object images using a predetermined method.

According yet further to the second aspect of the invention, the temporal processing performed by the temporal processing block may be performed for providing simultaneously the position and the orientation of the object in the three-dimensions and the articulation, all contained in the output signal. Further, the object-tracking system may further comprise: a graphical processing unit (GPU) or a PC graphics card, for producing synthetic object data, the synthetic object data may be generated for matching using a predetermined criterion with at least one set of the two-dimensional data pictorially representing the object and generated by the sensor for implementing the identification and tracking, wherein the synthetic object data may be generated using the articulation and the shape change of the object in the three dimensions.

According still further to the second aspect of the invention, a four-dimensional 600-cell polytope may be used to represent and sample the orientation of the object in the three dimensions.

According further still to the second aspect of the invention, the object-tracking system may further comprise: a pre-processor, for removing before the processing from at least one set of the two-dimensional data a contribution that provides no information about the object.

According yet further still to the second aspect of the invention, in addition to the at least one tracker-identifier, the object-tracking system may have multiple tracker-identifiers capable of generating the output signal.

Yet still further according to the second aspect of the invention, the object may be a surgical instrument, a mechanical tool, an input device, a human hand, a die, a coin, an agricultural product, a flying object, a ground vehicle, a sea vehicle, a manufactured part, a human face, or a human body.

Still yet further according to the second aspect of the invention, the multiple sets of the two-dimensional data at different temporal instances may be used for providing the output signal, wherein each of the multiple sets corresponds to one unique temporal instance out of the different temporal instances.

Still further yet according to the second aspect of the invention, the sensor may be an intensity sensor, a gray-level camera, a color camera, a hyperspectral optical sensor, a distance sensitive sensor or a ladar sensor.

Still further according to the second aspect of the invention, multiple objects may be identified simultaneously in the at least one set of the two-dimensional data.

According to a third aspect of the invention, a method for identifying and tracking an object from two-dimensional data pictorially representing the object, comprises the steps of: receiving at least one set of the two-dimensional data pictorially representing the object, wherein the at least one set corresponds to one temporal instance and the two-dimensional data is generated by a sensor; and processing the at least one set of the two-dimensional data using at least one tracker-identifier for providing an output signal containing a) a type of the object or b) a position or an orientation of the object in three-dimensions, wherein the processing comprises of generating harmonic images out of synthetic object images, wherein at least one of the synthetic object images contains the object, by summing the synthetic object images using k-dimensional hyperspherical harmonic weights, wherein k is an integer of at least a value of four.

According to a fourth aspect of the invention, an object-tracking system for identifying and tracking an object from two-dimensional data pictorially representing the object, comprises: a sensor, for receiving at least one set of the two-dimensional data pictorially representing the object, wherein the at least one set corresponds to one temporal instance; and at least one tracker-identifier, for processing the at least one set of the two-dimensional data, for providing an output signal containing a) a type of the object or b) a position or an orientation of the object in three-dimensions, wherein the processing comprises generating harmonic images out of synthetic object images, wherein at least one of the synthetic object images contains the object, by summing the synthetic object images using k-dimensional hyperspherical harmonic weights, wherein k is an integer of at least a value of four.

It is noted that the present invention works with a passive object having any coloring, any shape, and undergoing any type of parameterized shape change, whereas the prior art examples mentioned above require the objects to be modified in order to be tracked and identified. Moreover, these prior art examples do not support identification and tracking of multiple objects using regular cameras through algorithms that can be automatically generated and parameterized using CAD model-objects as described in the present invention. Furthermore, the present invention does not require that the component being tracked to be specifically designed for that purpose, e.g., the objects need not to actively emit light.

BRIEF DESCRIPTION OF THE DRAWINGS

For a better understanding of the nature and objects of the present invention, reference is made to the following detailed description taken in conjunction with the following drawings, in which.

BEST MODE FOR CARRYING OUT THE INVENTION

The present invention provides a new method for identifying and tracking an object from two-dimensional data pictorially representing said object by an object-tracking system through processing said two-dimensional data using at least one tracker-identifier belonging to the object-tracking system for providing an output signal containing: a) a type of the object, and/or b) a position or an orientation of the object in three-dimensions, and/or c) an articulation or a shape change of said object in said three dimensions.

According to an embodiment of the present invention, the type of the object can be determined using a spatial model description of said object available in the object-tracking system. Moreover, the processing performed by the tracker-identifier comprises spatial and temporal processing. Furthermore, according to an embodiment of the present invention, the spatial processing uniquely comprises generating harmonic images from synthetic object images, wherein at least one of the synthetic object images contains said object, by summing the synthetic object images using k-dimensional hyperspherical harmonic weights, wherein k is an integer of at least a value of four. For example, a four-dimensional 600-cell polytope can be used to sample the orientation of the object in said three dimensions.

According to an embodiment of the present invention, the object can be (but it is not limited to), e.g., a surgical instrument, a mechanical tool, an input device, a human hand, a die, a coin, an agricultural product, a flying object, a ground vehicle, a sea vehicle, a manufactured part, a human face, a human body, etc. Applications can include the identification and tracking of non-cooperative, such as passive objects and camouflaged objects, and cooperative objects, such as those that are marked for easy identification.

Figure 1:
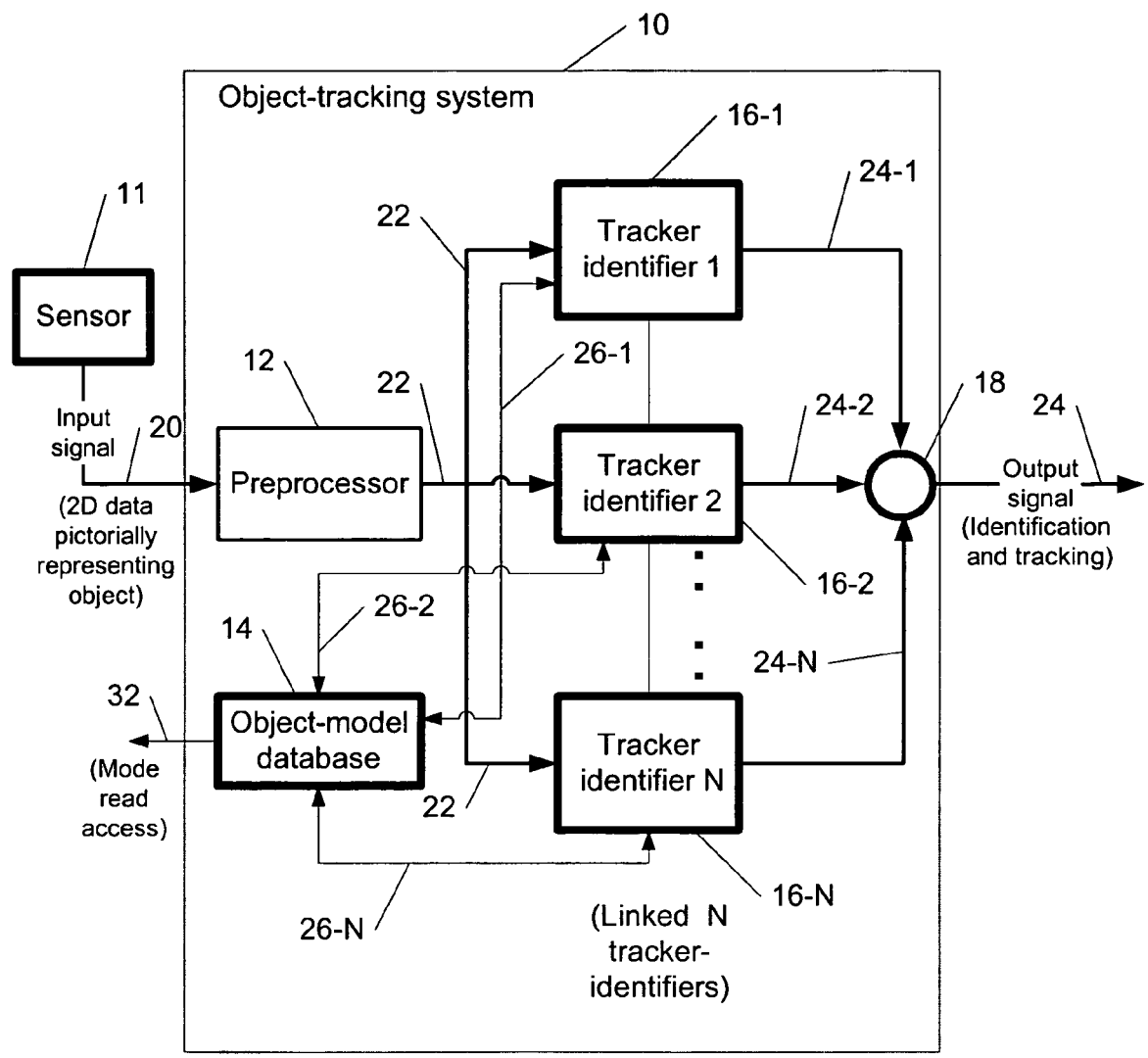
FIG. 1 is a block diagram of an object tracking system for identifying and tracking an object from two-dimensional data pictorially representing said object, according to an embodiment of the present invention.

FIG. 1 shows an example among others of a block diagram of an object tracking system 10 for identifying and tracking an object from two-dimensional data pictorially representing said object (e.g., a two-dimensional image), according to an embodiment of the present invention. The system 10 can be configured, e.g., using a descriptive language (such as one defined through the extensible markup language (XML)). Sensor 11 provides an input signal 20, which is two-dimensional data pictorially representing said object, to the object-tracking system. Typically the input signal 20 contains at least one set of said two-dimensional data pictorially representing the object (though multiple objects can be identified simultaneously in at least one set of said two-dimensional data as well), wherein said one set corresponds to one temporal instance. According to an embodiment of the present invention, the sensor 11 can be (but it is not limited to), e.g., an intensity sensor, a gray-level camera, a color camera, a hyperspectral optical sensor, a distance sensitive sensor such as a ladar sensor, an infrared camera, and x-ray imager, imaging radar, a stereoscopic sensor, imaging sonar, a magnetic resonance imaging sensor, etc.

During a simulation by the object-tracking system 10, the input signal 20 is first preprocessed to remove sensor anomalies (such as dead pixels, pixels with errors, etc.) which do not provide any information about the object, and a preprocessor output signal 22 is then processed sequentially and independently by a prioritized list of N linked and independent tracker-identifiers 16-1, 16-2, . . . , 16-N. Each tracker-identifier 16-1, 16-2, . . . , or 16-N is for providing identifying and/or tracking information of the object using an output tracker signal 24-1, 24-2, . . . , or 24-N. Each tracker-identifier 16-1, 16-2, . . . , or 16-N sequentially has an opportunity to take control of the output port 18, suppressing the algorithms related to other tracker-identifiers below and to provide an output signal 24 containing the identification and/or tracking information of the object. More specifically, according to an embodiment of the present invention, the output signal 24 can contain the following information: a) a type of the object, and/or b) a position and/or an orientation of the object in three-dimensions (e.g., using translation coordinates based on a Cartesian coordinate system), and/or c) an articulation and/or a shape change of said object in said three dimensions.

For the purpose of the present invention, the position of the object can be characterized by translation coordinates (e.g., using a Cartesian coordinate system) of a chosen point of the object, and the orientation of the object describes how other points of the object are distributed relative to said point chosen for describing the position of the object. For the purpose of the present invention, the articulation refers to moving of rigid objects relative to each other and shape change means moving both rigid and non-rigid objects.

There are many variations of operating said independent tracker-identifiers 16-1, 16-2, . . . , 16-N. For example, each tracker-identifier 16-1, 16-2, . . . , or 16-N can describe different operating conditions or different object families. This organization provides flexibility both in information flow and in adding and removing new tracker-identifiers. The interface to each individual tracker-identifier 16-1, 16-2, . . . , or 16-N is identical to the interface for the prioritized tracker-identifier system according to an embodiment of the present invention. This allows systems to be nested, such that, e.g., tracker-identifier 16-1 in FIG. 1 could itself be a prioritized tracker-identifier system. Thus, this approach supports a single tracker-identifier, a list, or a tree-structure. Furthermore, the approach of FIG. 1 is intended to accommodate all types of modal changes. It allows one unit to spawn others. For example, a midrange tracker-identifier could spawn one or more endgame tracker-identifiers.

All the tracker-identifiers 16-1, 16-2, . . . , 16-N have access to an object-model database 14 through signals 26-1, 26-2, . . . , 26-N, respectively, as shown in FIG. 1. According to an embodiment of the present invention, the type of the object is determined using a spatial model description of said object available in the object-model database 14. After the object was tracked and identified in the output signal 24, the user of the system 10 can visualize the object using a signal 31 (object-model read access) from the object-model database 14. Moreover, according to an embodiment of the present invention, multiple sets of the two-dimensional data (e.g., image frames) contained in the input signal 20 at different temporal instances can be used for providing the output signal 24, wherein each of the multiple sets corresponds to one unique temporal instance out of the different temporal instances.

The object-tracking system 10 described above is complex, with a variable number of the independent tracker-identifiers 16-1, 16-2, . . . , 16-N, each of which can use a different algorithm. A flexible, comprehensive language can be used for describing and configuring it. A good example is the extensible markup language (XML) mentioned above. XML is a text-based representation of data that offers many advantages. It is convenient, robust, and extendable through configurable tags. However, the present invention is not limited to XML. Any similar, configurable method for describing a configuration language could be used.

Figure 2:
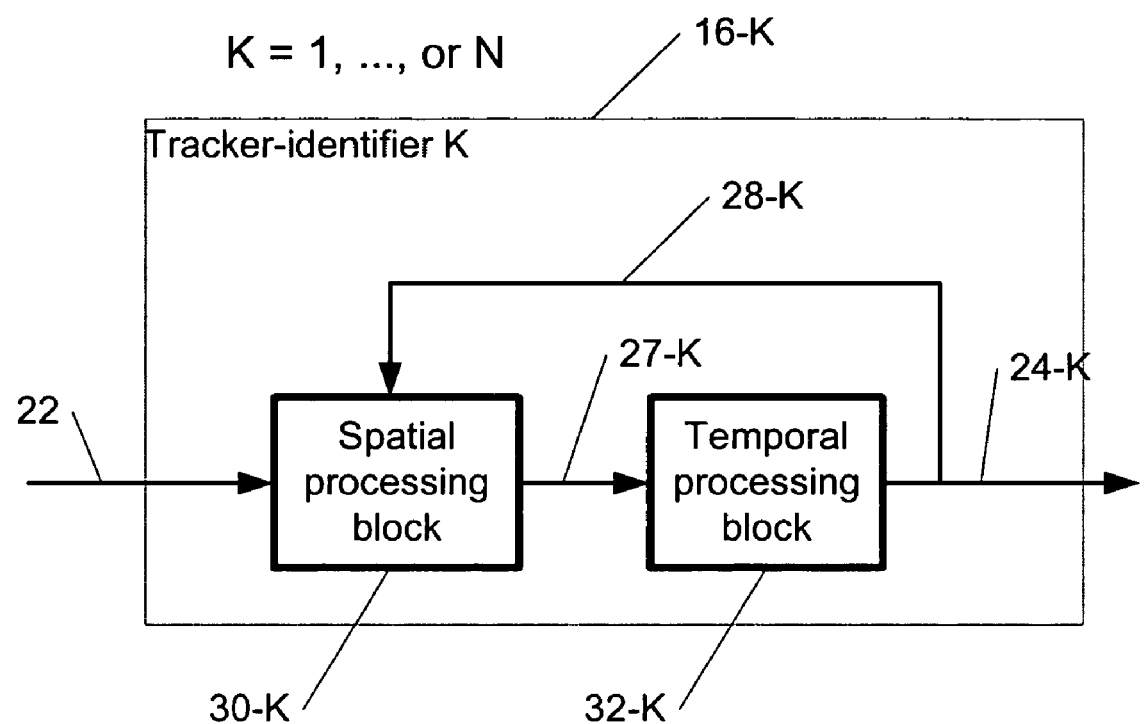
FIG. 2 is a block diagram of a tracker-identifier, according to an embodiment of the present invention.

FIG. 2 is a block diagram of an independent tracker-identifier 16-K (K=1, 2, . . . , or N), according to an embodiment of the present invention. All independent tracker-identifiers 16-1, 16-2, . . . , 16-N have the same structure. Each tracker-identifier 16-K in the prioritized system is organized into two parts, spatial (a spatial processing block 30-K) and temporal (a temporal processing block 32-K) processing, as shown in FIG. 2. (However, in an alternative embodiment of the present invention the temporal processing is optional). The spatial processor block 30-K analyzes a single image (containing at least one object) and extracts multiple hypotheses of a type, a pose (i.e., position and orientation), and articulation of the object in the image. Multiple objects can be also found as stated above. The spatial processing block 30-K can use a priori object-pose estimates contained in a signal (an additional input signal) 28-K (fed back from the temporal processing block 32-K) for efficiency, but it must be able to identify the objects contained in the image without relying on the signal 28-K. Every object has to be found a first time by the spatial processor block 30-K and to be contained in a further input signal 27-K. The further input signal 27-K is provided to the temporal processing block 32-K.

The temporal processing block 32-K combines multiple looks at the object and incorporates expected object-motion dynamics. The input to the temporal processing block 32-K is the object state that is calculated in the spatial processor and contained in the further input signal 27-K. The temporal processing block 32-K correlates object locations from frame to frame to produce more accurate and robust estimates. It also allows the calculation of values that cannot be directly measured in a single image, such as object velocity.

Figure 3:
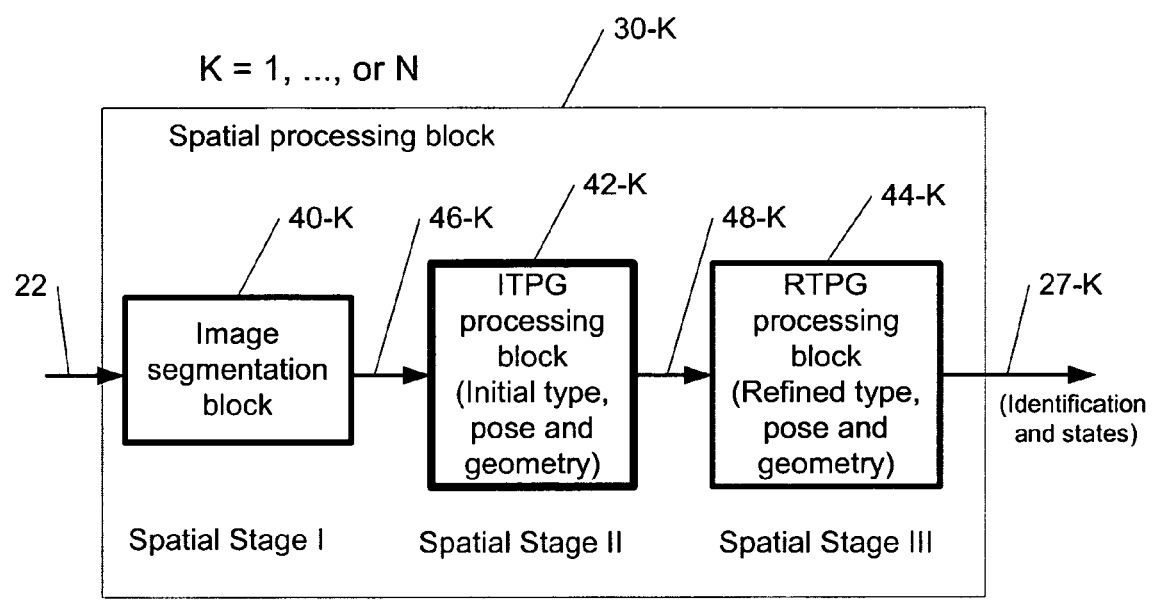
FIG. 3 is a block diagram of a spatial processing block of a tracker identifier, according to an embodiment of the present invention.

FIG. 3 shows one example among others of a block diagram of a spatial processing block of a tracker identifier 16-K, according to an embodiment of the present invention. The spatial-processing block 30-K shown in FIG. 2 itself uses three stages: an image segmentation block 40-K wherein objects are segmented from the background, an ITPG (initial type, pose, and geometry) processing block 42-K wherein the type, pose, and geometry of all objects in the image are roughly estimated, and an ITPG (initial type, pose, and geometry) processing block 44-K wherein the type, pose, and geometry of all objects in the image are calculated, as illustrated in FIG. 3. The term "geometry" here includes articulation. These stages are described below in more detail.

The image segmentation block 40K finds all the objects in an image and isolates them from the background. For this, the system uses edge detection and thresholding to first find the pixels that are part of the object. After the pixels are identified, nearby pixels are grouped into blobs. These blobs represent the potential objects in the image and are the product of the segmentation algorithm. This is the segmentation technique used in the current invention. A variety of segmentation methods are well established, as described by N. R. Pal and S. K. Pal in "A Review on Image Segmentation Techniques," Pattern Recognition, vol. 26, No. 9, pp. 1277-1294, 1993.

Figure 4:
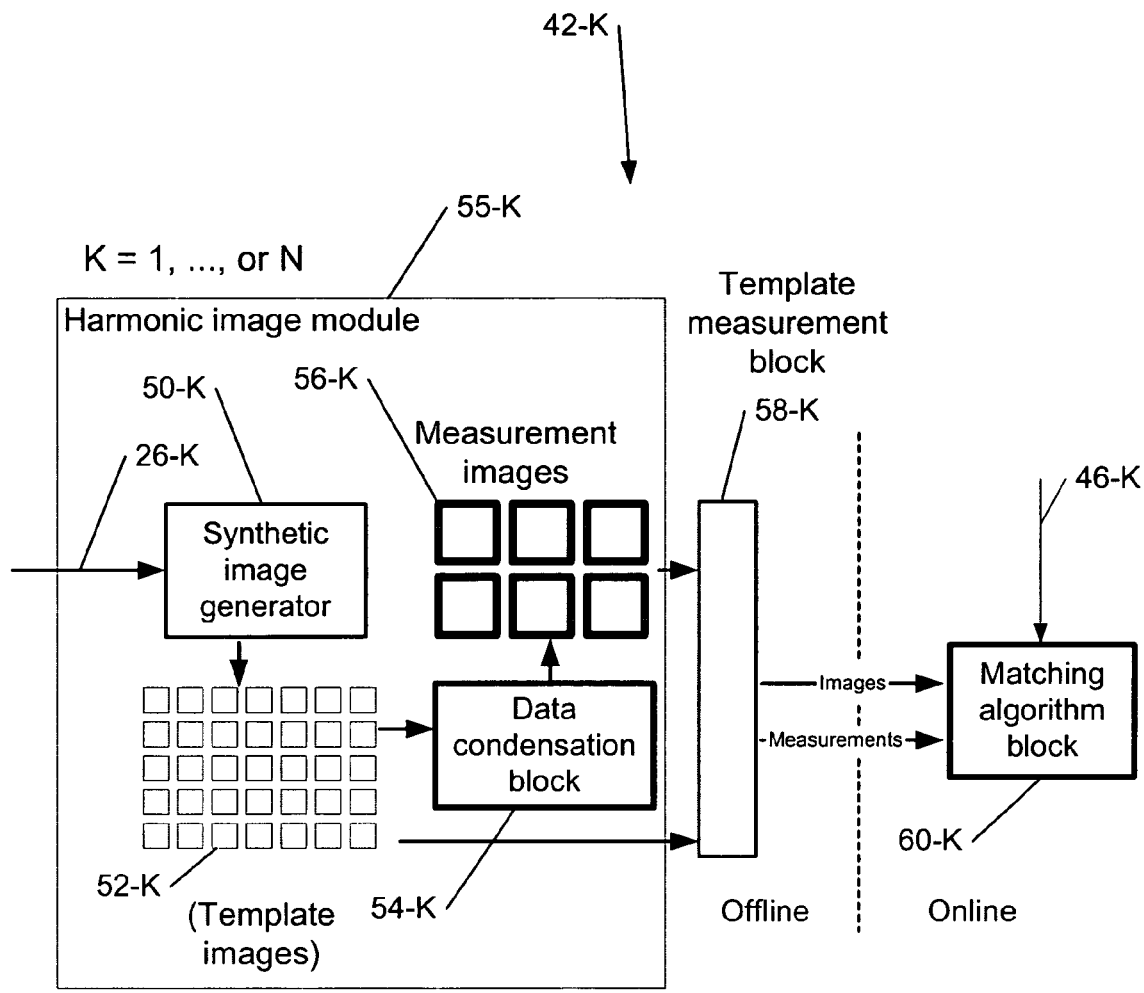
FIG. 4 is a block/flow diagram for implementing a second stage (ITPG) of spatial processing by a spatial processing block, according to an embodiment of the present invention.

The ITPG processing block 42-K of FIG. 3 uses matched filtering (see a template measurement block 58-K in FIG. 4). This approach has been successfully applied to quickly detect objects by I. Reed, R. Gagliardi, and L. Stotts in "Optical Moving Target Detection with 3-D Matched Filtering," *IEEE Transactions on Aerospace and Electronic Systems*, vol. 24, No. 4, July 1988; to identify the pose of objects by M. Uenohara and T. Kanade in "Use of Fourier and Karhunen-Loeve Decomposition for Fast Pattern Matching with a Large Set of Templates," *IEEE Transactions on Pattern Analysis and Machine Intelligence*, vol 19, no. 8, August 1997, pp 891-898 and by H. Murase and S. K. Nayar in "Parametric Eigenspace Representation for Visual Learning and Recognition," *Geometric Methods in Computer Vision II*, SPIE, vol. 2031, 1993, pp. 378-391; and to discriminate between them by S. K. Nayar, S. A. Nene, and H. Murase in "Real-Time 100 Object Recognition System," Proceedings of the 1996 *IEEE International Conference on Robotics and Automation*, Minneapolis, Minn., April 1996., including those in confusing environments as described by W. A. C. Schmidt in "Modified Matched Filter for Cloud Clutter Suppression," *IEEE Transactions on Pattern Analysis and Machine Intelligence*, vol. 12, no. 6, June 1990 and by M. Hiroshi and S. K. Nayar in "Detection of 3D Objects in Cluttered Scenes Using Hierarchical Eigenspace," *Pattern Recognition Letters*, vol. 18, 1997, pp. 375-384. Applying template matching to the object recognition and tracking problem is a unique part of the present invention.

The template matching is best viewed in the context of its alternative. A direct approach to object matching might use millions of prerecorded images of the object over a range of every possible orientation, position, and articulation. The pose of the object in a new image could then be estimated as the pose of the most closely matching recorded image based on some metric, such as the sum of pixel differences squared. This approach, though conceptually appealing, is not practical. It is not feasible to take millions of real camera images and subsequently it is not possible to calculate millions of sums of squares in real time.

Alternatively, the present invention uses the more efficient approach of condensing synthetic images using an image subspace that captures key information. Three degrees of orientation, three degrees of position, and any number of degrees of freedom in geometry change are included. To do this, a template-matching framework is applied as described below.

FIG. 4 shows an example among others of a block/flow diagram for implementing a second stage (ITPG) of spatial processing by a spatial processing block 42-K and utilizing the template-matching framework, according to an embodiment of the present invention. This framework uses an offline system for calculating template images 52-K, measurement images 59-K (from harmonic images 56-K), and the measurements of the template images 57-K. These results are used online by a matching algorithm block 60-K to match segmented objects (represented by a segmentation signal 46-K) against the templates (represented by the signals 59-K and 57-K) thus implementing ITPG processing and providing an IPTG signal 48-K.

The template images (or synthetic object images) 52-K are generated by a synthetic image generator 50-K using the appropriate signal 26-K from the object-model database 14, wherein at least one of said synthetic object images 52-K contains the object or objects of interest (to be identified and tracked by object tracking system 10). The harmonic images 56-K are generated from the synthetic object images 52-K by a data condensation block 54-K, wherein the number (P) of the measurement (harmonic) images 56-K is typically smaller than the number (M) of synthetic object images 52-K. The harmonic images 56-K are further provided to the matching algorithm block 60-K. The number of harmonic images 56-K provides direct control over the tradeoff of run time for accuracy. Furthermore, the measurements of the template images 57-K are provided by the template measurement block 58-K in response to the template images 52-K and the harmonic images 56-K. The combined blocks 50-K and 54-K are identified as a harmonic image module 55-K which performance is further discussed below.

An important issue is that of how to sample the images across three-dimensional rotations. The present invention technique relies on the use of unit quaternions, which are points on the surface of a four-dimensional sphere. Each quaternion maps to a three-dimensional rotation. Sign does not matter for a quaternion in this case, and sampling evenly over a four-dimensional hemisphere equates to sampling evenly over all three-dimensional rotations.

Thus, object orientations for building the template images 52-K are found by selecting equidistant points on the surface of the four-dimensional quaternion hypersphere 62-K (see FIG. 5) using a predetermined method. To do this, points on the hypersphere 62-K are specified using two $\phi$-values and one $\theta$-value through the following equation:

$$q = \begin{bmatrix} \sin(\phi_1)\sin(\phi_2)\sin(\theta) \\ \sin(\phi_1)\sin(\phi_2)\cos(\theta) \\ \sin(\phi_1)\cos(\phi_2) \\ \cos(\phi_1) \end{bmatrix} \quad (1)$$

wherein $0 < \phi_1 \pi$, $0 < \phi_2 \pi$, and $-\pi < \theta \pi$.

In order to build the measurement (or harmonic) images 56-K, the template images (or synthetic object images) 52-K are weighted using harmonic functions by the data condensation block 54-K. In other words, using Equation 1, a hyper-spherical harmonic function can be specified through three integer indices, i, j, k, with $0 < i$, $0 < j$ $i$, and $-j$ k $j$ (see, e.g., Z.-Y. Wen and J. Avery, "Some Properties of Hyperspherical Harmonics," *The Journal of Mathematical Physics*, vol. 26, no. 3, March 1985, pp. 396-403, and J. Avery, *Hyperspherical Harmonics and Generalized Sturmians*, Kluwer Academic Publishers, Dordrecht, 2000, pp. 33-57. For a given set of indices, the function value at the point specified through a set of $\phi$- and $\theta$-values is given by the following equation:

$$YY(i, j, k, \phi_1, \phi_2, \theta) = \quad (2)$$
$$2^j \Gamma(j+1) \sqrt{\frac{2(i+1)(i-j)!}{\pi(1+i+j)}} \sin^j(\phi_1) G(i-j, j+1, \cos(\phi_1)) Y_j^k(\phi_2, \theta),$$

where $\Gamma(\cdot)$ is the gamma function, G(n,m,x) is the n-th Gegenbauer polynomial in x for parameter m, and $Y_j^k(\phi,\theta)$ is the ordinary spherical harmonic function of elevation $\phi$ and azimuth $\theta$ for parameters j and k.

For a dense set of samples (template images 52-K) over the hyperhemisphere defined using Equation 1, each image is weighted by the value of the hyperspherical harmonic function at that point using Equation 2. These weighted images are further processed using a predetermined algorithm to give the harmonic measurement images 56-K. According to an embodiment of the present invention, the further processing can include summing, averaging, selective removal, and/or principal component analysis, etc.

A precursor harmonic-function approach was envisioned by Chang in *Fast Eigenspace Decomposition of Correlated Images*, Ph.D. Dissertation, pp. 18-68, Purdue University, 2000 and by C.-Y. Chang, A.-A. Maciejewski, and V. Balakrishnan, in "Fast Eigenspace Decomposition of Correlated Images," IEEE Transactions on Image Processing, September 2000.

Figure 5:
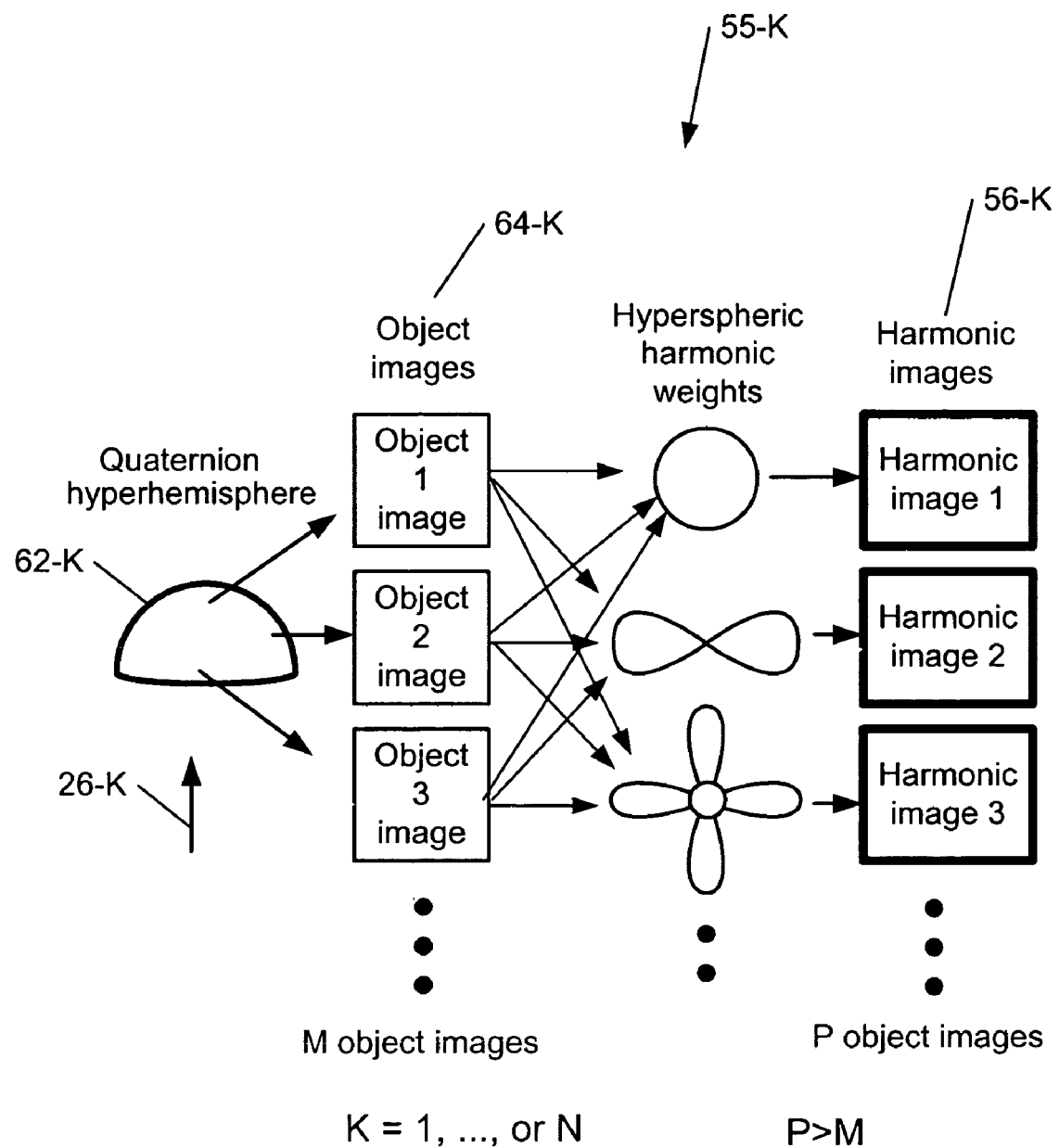
FIG. 5 is a flow diagram demonstrating a concept of creating harmonic images used for implementing the second stage (ITPG) spatial processing in FIG. 4, according to an embodiment of the present invention.

This process is further illustrated based on the above description in FIG. 5 which shows an example among others of a flow diagram demonstrating a performance of the harmonic image module 55-K for creating harmonic images used for implementing the second stage (ITPG) spatial processing in FIG. 4, according to an embodiment of the present invention.

The final module in FIG. 3 is the RTPG processing block 44-K. Its role is to find the exact states of the objects given initial conditions (e.g., contained in the ITPG signal 48-K) provided by the ITPG processing block 42-K. The requirement that the initial conditions exist allows the block 44-K to make use of a local search (whereas the ITPG processing block 42-K had a global scope). To perform the local search, three-dimensional model matching is used, where a synthetic image 70-K (see FIG. 6) of the object is created and compared to the preprocessor output signal 22.

The availability of low-cost PC graphics hardware allows rapid creation of synthetic images. In the approach of the present invention, a function of orientation, distance, and articulation is defined as a metric on the difference between the captured image and a synthetic image with the object in the given orientation, distance, and articulation. The synthetic image 70-K of the object is created by a synthetic image generator 78-K (which can be the same as generator 50-K in FIG. 4) using a model that is looked up in the object-model database 14 shown in FIG. 1. This metric is minimized using Nelder and Mead's algorithm described by J. A. Nelder and R. Mead in "A Simplex Method for Function Minimization," Computer Journal, vol. 7, pp. 308-313, 1965 with the orientation, distance, and articulation giving the minimum metric value chosen as the best estimate of truth. Through geometric calculation using camera (i.e., sensor 11) position and orientation, the results of this process provide accurate object type, pose, and geometry.

Figure 6:
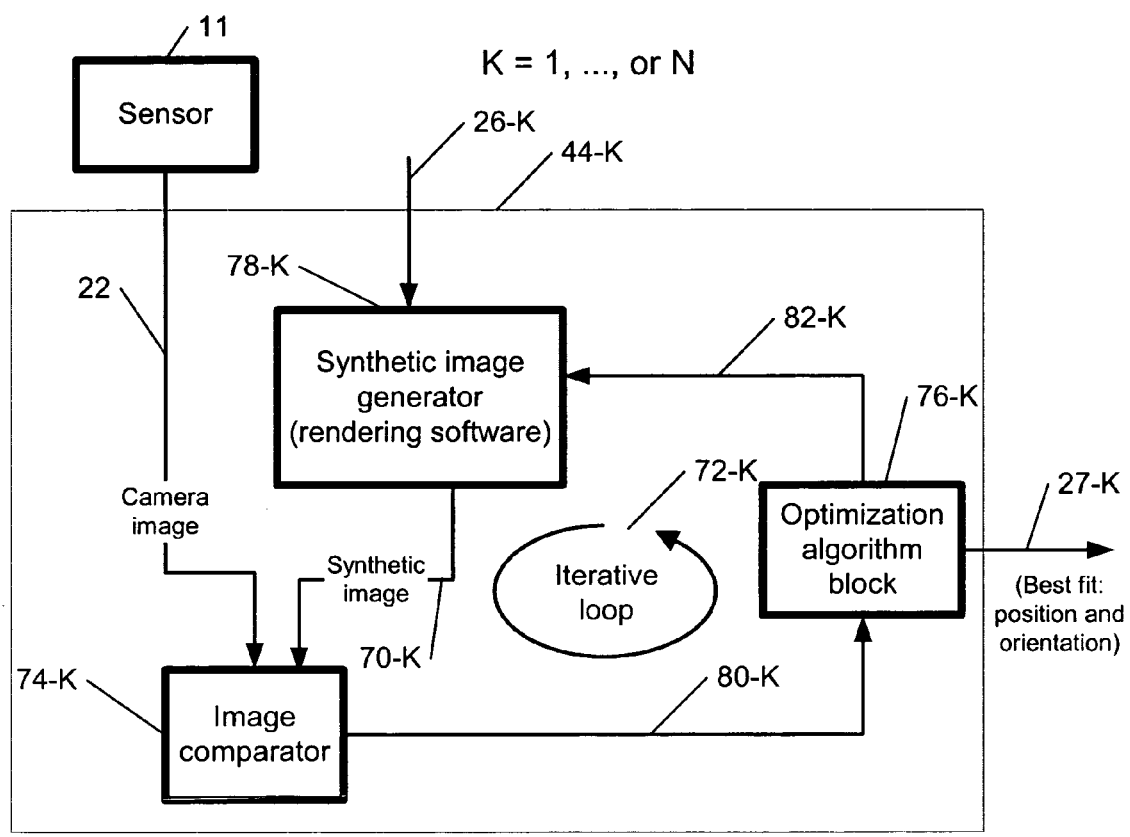
FIG. 6 is a block diagram for implementing a third stage (RTPG) of spatial processing by a spatial processing block, according to an embodiment of the present invention.

This is illustrated in FIG. 6 showing one example among others of a block diagram for implementing a third (RTPG) stage of spatial processing by the RTPG processing block 44-K, according to an embodiment of the present invention. An image comparator 74-K generates a difference signal 80-K between signals 22 and 70-K. An optimization algorithm block 76-K processes said difference signal 80-K using a predetermined algorithm/criterion, e.g., optimizing the difference between the captured image and a synthetic image over type, orientation, distance, environment, and articulation and providing the further input signal 27-K (to the block 32-K) if the predetermined criterion is met. If the predetermined criterion is not met, a further position and orientation signal 82-K is provided to the synthetic image generator 78-K for generating the synthetic image 70-K again and the optimization process continues until the predetermined criterion is met.

To combine the spatial results (the signal 27-K) over multiple frames of video data (from the sensor 11), multiple hypothesis tracking (MHT) is used by the temporal processing block 32-K. MHT is conceptually a complete model that allows a tradeoff between computational time and accuracy. When multiple tools are present, measurements can be connected in an exponentially large number of ways to form tracks. A practical implementation reduces connections to fit the processing time available. Realistic MHT algorithms developed over the years have reduced connections by exploiting various data structures, such as trees and filtered lists of tracks. These techniques eliminate unlikely data associations early, and processing time and accuracy can be controlled through the selection of track capacity. The present invention further extended the MHT for applying it to the new form of the spatial measurement disclosed herein.

There are two broad classes of MHT implementations, hypothesis centric and track centric. The original MHT algorithm proposed by D. B. Reid in "An Algorithm for Tracking Multiple Targets," *IEEE Transactions on Automatic Control*, AC-24(6), pp. 843-854, December 1979 uses a hypothesis-centric approach, where hypotheses were scored and hypothesis scores propagated. Track scores were calculated from existing hypotheses. Track-centric algorithms, such as those proposed by T. Kurien in "Issues in the Design of Practical Multitarget Tracking Algorithms," Multitarget-Multisensor Tracking: Advanced Applications, Y. Bar-Shalom Editor, Artech House, 1990 score tracks and calculate hypothesis scores from the track scores. According to an embodiment of the present invention, a track-centric approach is used (however, other method can be also applied) with persistent database structures for measurements, tracks, hypotheses, and related information. Each database can be configured to preserve data for any number of time steps. For minimizing random access memory (RAM) use, the life of the databases can be set to one time step, or for algorithms that reference historical data, the databases can be configured to retain data for seconds or even minutes.

As explained above, the invention provides both a method and corresponding equipment consisting of various modules providing the functionality for performing the steps of the method. The modules may be implemented as hardware, or may be implemented as software or firmware for execution by a processor. In particular, in the case of firmware or software, the invention can be provided as a computer program product including a computer readable storage structure embodying computer program code (i.e. the software or firmware) thereon for execution by a computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for identifying and tracking an object from two-dimensional data pictorially representing said object, comprising:
   receiving, from a sensor, at least one set of said two-dimensional data pictorially representing said object, wherein said at least one set corresponds to one temporal instance and said two-dimensional data is generated by the sensor;
   processing, via a computing device, said at least one set of said two-dimensional data using at least one tracker-identifier for providing an output signal including a type of said object, at least one of a position and an orientation of said object in three-dimensions, and an articulation change and a shape change of said object in said three dimensions, wherein said type of the object is determined using a spatial model description of said object; and
   generating synthetic object images, via said processing, by selecting points on a surface of a four-dimensional quaternion hyperhemisphere using a predetermined method.

2. The method of claim 1, wherein said processing includes spatial processing of a first input signal indicative of said at least one set of said two-dimensional data performed by a spatial processing block and temporal processing performed by a temporal processing block, wherein said spatial processing provides a second input signal to said temporal processing block.

3. The method of claim 2, wherein said temporal processing block provides a third input signal to said spatial processing block.

4. The method of claim 2, wherein said spatial processing comprises generating harmonic images out of said synthetic object images, wherein at least one of said synthetic object images contains said object, by further processing using a predetermined algorithm said synthetic object images using hyperspherical harmonic weights.

5. The method of claim 4, wherein said further processing comprises at least one of:
   summing, averaging, selective removal, and principal component analysis.

6. The method of claim 2, wherein said temporal processing is performed for providing simultaneously said position and said orientation of the object in said three-dimensions and said articulation, all contained in said output signal.

7. The method of claim 2, wherein said spatial processing comprises:
   generating synthetic object data using at least one of a graphical processing unit and a PC graphics card, said synthetic object data is generated for matching using a predetermined criterion with at least one set of said two-dimensional data pictorially representing said object and generated by said sensor for implementing said identification and tracking, wherein said synthetic object data is generated using said articulation and said shape change of said object in said three dimensions.

8. The method according to claim 1, wherein a four-dimensional 600-cell polytope is used to sample said orientation of said object in said three dimensions.

9. The method of claim 1, wherein before the step of said processing said at least one set of said two-dimensional data is pre-processed to remove a contribution that provides no information about said object.

10. The method of claim 1, wherein, in addition to said at least one tracker-identifier, said object-tracking system has multiple tracker-identifiers configured to generate said output signal.

11. The method of claim 1, wherein said object is at least one of a surgical instrument, a mechanical tool, an input device, a human hand, a die, a coin, an agricultural product, a flying object, a ground vehicle, a sea vehicle, a manufactured part, a human face, and a human body.

12. The method of claim 1, wherein multiple sets of said two-dimensional data at different temporal instances are used for providing said output signal, wherein each of said multiple sets corresponds to one unique temporal instance out of said different temporal instances.

13. The method of claim 1, wherein the sensor is at least one of an intensity sensor, a gray-level camera, a color camera, an infrared camera, and x-ray imager, imaging radar, a hyperspectral optical sensor, a stereoscopic sensor, imaging sonar, a magnetic resonance imaging sensor, a distance sensitive sensor and a ladar sensor.

14. The method according to claim 1, where multiple objects are identified simultaneously in said at least one set of said two-dimensional data.

15. An object-tracking system for identifying and tracking an object from two-dimensional data pictorially representing said object, comprising:
  a sensor configured to receive at least one set of said two-dimensional data pictorially representing said object, wherein said at least one set corresponds to one temporal instance;
  a computing device including at least one tracker-identifier configured to process said at least one set of said two-dimensional data, and further configured to provide an output signal including a type of the object, at least one of a position and an orientation of the object in three-dimensions, and an articulation change and a shape change of said object in said three dimensions, wherein said type of the object is determined using a spatial model description of said object; and
  an object-model database in communication with said at least one tracker-identifier for providing points on a surface of a four-dimensional quaternion hyperhemisphere for generating synthetic object images using a predetermined method.

16. The object-tracking system of claim 15, wherein said at least one tracker-identifier is further configured for spatial processing of a first input signal indicative of said at least one set of said two-dimensional data performed by a spatial processing block and temporal processing performed by a temporal processing block, wherein said spatial processing provides a second input signal to said temporal processing block.

17. The object-tracking system of claim 16, wherein said temporal processing block is configured to provide a third input signal to said spatial processing block.

18. The object-tracking system of claim 16, wherein said spatial processing block is configured to generate harmonic images out of said synthetic object images, wherein at least one of said synthetic object images includes said object, by further processing using a predetermined algorithm said synthetic object images using hyperspherical harmonic weights.

19. The object-tracking system of claim 18, wherein said further processing comprises at least one of:
  summing, averaging, selective removal, and principal component analysis.

20. The object-tracking system of claim 16, wherein said temporal processing block is configured to perform said temporal processing for providing simultaneously said position and said orientation of the object in said three-dimensions and said articulation, all contained in said output signal.

21. The object-tracking system of claim 16, wherein said object-tracking system further comprises:
  at least one of a graphical processing unit and a PC graphics card configured to generate synthetic object data, said synthetic object data is generated for matching using a predetermined criterion with at least one set of said two-dimensional data pictorially representing said object and generated by said sensor for implementing said identification and tracking, wherein said synthetic object data is generated using said articulation and said shape change of said object in said three dimensions.

22. The object-tracking system of claim 15, wherein a four-dimensional 600-cell polytope is used to represent and sample said orientation of said object in said three dimensions.

23. The object-tracking system of claim 15, wherein said object-tracking system further comprises: a preprocessor configured to remove, before said processing from at least one set of said two-dimensional data, a contribution that provides no information about said object.

24. The object-tracking system of claim 15, wherein, in addition to said at least one tracker-identifier, said object-tracking system has multiple tracker-identifiers configured to generate said output signal.

25. The object-tracking system of claim 15, wherein said object is at least one of a surgical instrument, a mechanical tool, an input device, a human hand, a die, a coin, an agricultural product, a flying object, a ground vehicle, a sea vehicle, a manufactured part, a human face, and a human body.

26. The object-tracking system according to claim 15, wherein multiple sets of said two-dimensional data at different temporal instances are used for providing said output signal, wherein each of said multiple sets corresponds to one unique temporal instance out of said different temporal instances.

27. The object-tracking system according to claim 15, wherein the sensor is at least one of an intensity sensor, a gray-level camera, a color camera, a hyperspectral optical sensor, a distance sensitive sensor and a ladar sensor.

28. The object-tracking system according to claim 15, wherein multiple objects are identified simultaneously in said at least one set of said two-dimensional data.

29. A method comprising:
  receiving, from a sensor, representing an object, wherein said data corresponds to one temporal instance and is generated by the sensor; and
  processing, via a computing device, said data using at least one tracker-identifier for providing an output signal including at least one of a type of the object a position, and an orientation of the object;
  generating synthetic object images, via said processing, by selecting points on a surface of a four-dimensional quaternion hyperhemisphere using a predetermined method; and
  wherein said processing comprises generating harmonic images out of said synthetic object images, wherein at least one of said synthetic object images contains said object, by summing said synthetic object images using hyperspherical harmonic weights.

30. A system comprising:

a sensor configured to receive data representing an object, wherein said data corresponds to one temporal instance of the object;

a computing device including at least one tracker-identifier configured to process said data and further configured to provide an output signal including at least one of a type of the object, a position, and an orientation of the object;

an object-model database in communication with said at least one tracker-identifier for providing points on a surface of a four-dimensional quaternion hyperhemisphere for generating synthetic object images using a predetermined method; and wherein said processing comprises generating harmonic images out of said synthetic object images, wherein at least one of said synthetic object images contains said object, by summing said synthetic object images using hyperspherical harmonic weights.

* * * * *